US008915595B2

(12) United States Patent
O'Connell et al.

(10) Patent No.: US 8,915,595 B2
(45) Date of Patent: Dec. 23, 2014

(54) METHOD OF MANUFACTURING FOIL FOR PRODUCING A PEPPER'S GHOST ILLUSION

(75) Inventors: Ian O'Connell, London (GB); Michael Abrahams, London (GB)

(73) Assignee: Musion IP Limited, London (GB)

( * ) Notice: Subject to any disclaimer, the term of this patent is extended or adjusted under 35 U.S.C. 154(b) by 559 days.

(21) Appl. No.: 13/142,139

(22) PCT Filed: Dec. 24, 2009

(86) PCT No.: PCT/GB2009/051774
§ 371 (c)(1),
(2), (4) Date: Nov. 14, 2011

(87) PCT Pub. No.: WO2010/073051
PCT Pub. Date: Jul. 1, 2010

(65) Prior Publication Data
US 2012/0154753 A1    Jun. 21, 2012

Related U.S. Application Data

(60) Provisional application No. 61/140,817, filed on Dec. 24, 2008.

(30) Foreign Application Priority Data

Oct. 16, 2009  (GB) .................................. 0918115.7

(51) Int. Cl.
| G03B 21/00 | (2006.01) |
| B32B 3/00 | (2006.01) |
| B32B 27/08 | (2006.01) |
| B21C 37/00 | (2006.01) |
| G02B 27/22 | (2006.01) |
| B29C 55/14 | (2006.01) |
| B29C 47/00 | (2006.01) |
| B29C 47/04 | (2006.01) |
| B29C 47/06 | (2006.01) |
| B29K 67/00 | (2006.01) |
| B29K 105/00 | (2006.01) |

(52) U.S. Cl.
CPC .......... B29C 55/143 (2013.01); *B29C 2791/007* (2013.01); *G02B 27/2292* (2013.01); *B29C 47/043* (2013.01); *B29C 47/065* (2013.01); *B29K 2067/00* (2013.01); B29C 47/009 (2013.01); *B29K 2105/0026* (2013.01); B29C 47/0026 (2013.01)
USPC ................. 353/10; 353/121; 345/6; 428/172; 428/525; 428/606

(58) Field of Classification Search
USPC .......... 353/10, 121; 345/6; 428/172, 523, 606
See application file for complete search history.

(56) References Cited

U.S. PATENT DOCUMENTS

| 1,053,887 A | 2/1913 | Sontag |
| 1,358,110 A | 11/1920 | Presicce |

(Continued)

FOREIGN PATENT DOCUMENTS

| DE | 3610218 | 10/1987 |
| DE | 3808406 | 4/1989 |

(Continued)

OTHER PUBLICATIONS

International search report in corresponding GB0525993.2.

(Continued)

*Primary Examiner* — Georgia Y Epps
*Assistant Examiner* — Magda Cruz
(74) *Attorney, Agent, or Firm* — McClure, Qualey & Rodack, LLP

(57)  ABSTRACT

A method of producing a Pepper's Ghost Illusion comprising using a reflective and semi-transparent foil formed from a polymeric composite, the polymeric composite including a flame retardant.

18 Claims, 3 Drawing Sheets

(56) References Cited

U.S. PATENT DOCUMENTS

| | | | |
|---|---|---|---|
| 2,198,815 A | 4/1940 | Haskin | |
| 3,035,836 A | 5/1962 | McCulley | |
| 4,805,895 A | 2/1989 | Rogers | |
| 4,928,301 A | 5/1990 | Smoot | |
| 4,971,312 A | 11/1990 | Weinreich | |
| 5,117,285 A | 5/1992 | Nelson | |
| 5,159,445 A | 10/1992 | Gitlin et al. | |
| 5,181,122 A | 1/1993 | Ooishi | |
| 5,194,955 A | 3/1993 | Yoneta et al. | |
| 5,255,028 A | 10/1993 | Biles | |
| 5,317,405 A | 5/1994 | Kuriki et al. | |
| 5,573,325 A | 11/1996 | Lekowski | |
| 5,619,254 A | 4/1997 | McNelley | |
| 5,639,151 A | 6/1997 | McNelley et al. | |
| 5,666,155 A | 9/1997 | Mersereau | |
| 5,669,685 A | 9/1997 | Kotani et al. | |
| 5,685,625 A | 11/1997 | Beaver | |
| 5,777,665 A | 7/1998 | McNelley et al. | |
| 5,865,519 A | 2/1999 | Maass | |
| 5,890,787 A | 4/1999 | McNelley et al. | |
| 5,913,591 A | 6/1999 | Melville | |
| 5,953,052 A | 9/1999 | McNelley et al. | |
| 6,042,235 A | 3/2000 | Machtig et al. | |
| 6,243,130 B1 | 6/2001 | McNelley et al. | |
| 6,481,851 B1 | 11/2002 | McNelley | |
| 6,654,045 B2 | 11/2003 | Allen et al. | |
| 6,710,797 B1 | 3/2004 | McNelley et al. | |
| 6,783,247 B2 | 8/2004 | White | |
| 6,882,358 B1 | 4/2005 | Schuster et al. | |
| 7,057,637 B2 | 6/2006 | White | |
| 7,136,090 B1 | 11/2006 | White | |
| 7,209,160 B2 | 4/2007 | McNelley et al. | |
| 7,883,212 B2 | 2/2011 | O'Connell et al. | |
| 2003/0035917 A1* | 2/2003 | Hyman | 428/67 |
| 2004/0043649 A1 | 3/2004 | O'Connell | |
| 2005/0142371 A1 | 6/2005 | Swain et al. | |
| 2007/0197700 A1 | 8/2007 | Gallucci et al. | |
| 2007/0201004 A1* | 8/2007 | O'Connell et al. | 353/10 |

FOREIGN PATENT DOCUMENTS

| | | |
|---|---|---|
| DE | 3807598 | 9/1989 |
| DE | 19915943 | 10/2000 |
| EP | 1133658 | 5/2003 |
| FR | 389185 | 9/1908 |
| FR | 408191 | 3/1910 |
| FR | 2714741 | 7/1995 |
| GB | 23473 | 0/1900 |
| GB | 1097812 | 1/1968 |
| GB | 2039680 | 8/1980 |
| GB | 2267563 | 12/1993 |
| GB | 2321565 | 7/1998 |
| GB | 2357829 | 7/2001 |
| JP | 63228890 | 9/1988 |
| JP | 2001313849 | 11/2001 |
| JP | 2003007103 | 1/2003 |
| JP | 2004131837 | 4/2004 |
| JP | 2007064996 | 3/2007 |
| JP | 2007143076 | 6/2007 |
| JP | 2008046410 | 2/2008 |
| JP | 2008102946 | 5/2008 |
| WO | 8905682 | 6/1989 |
| WO | 0111880 | 2/2001 |
| WO | 2005096095 | 10/2005 |
| WO | 2005107116 | 11/2005 |
| WO | 2006070675 | 7/2006 |
| WO | 2007052005 | 5/2007 |
| WO | 2007072014 | 6/2007 |
| WO | 2008040670 | 4/2008 |
| WO | 2008068016 | 6/2008 |

OTHER PUBLICATIONS

International search report in corresponding GB0625525.1.
English Abstract of JP2008102946.
English Abstract of JP2007143076.
English Abstract of JP2007064996.
English Abstract of JP2008046410.
English Abstract of JP2003007103.
English Abstract of JP2004131837.
English Abstract of JP2001313849.
English Abstract of DE3610218.
English Abstract of FR2717741.
English Abstract of DE3808406.
English Abstract of JP63228890.
International Search Report dated Jul. 19, 2010, author Achim Bahr.

* cited by examiner

METHOD OF MANUFACTURING FOIL FOR PRODUCING A PEPPER'S GHOST ILLUSION

CROSS REFERENCE TO RELATED APPLICATION

This application claims priority to "A METHOD OF MANUFACTURING FOIL FOR PRODUCING A PEPPER'S GHOST ILLUSION," having serial number PCT/GB2009/051774, filed on Dec. 24, 2009, which claims priority to and the benefit of GB Application No. 0918115.7, dated 16 Oct. 2009 and U.S. Provisional Application No. 61/140,817, filing date 24 Dec. 2008, each of which is incorporated by reference herein.

FIELD OF THE INVENTION

The present invention relates to a foil for producing a Pepper's Ghost Illusion and in particular a transparent flame resistant foil for producing a Pepper's Ghost Illusion. More specifically the invention concerns a method of testing, rolling and storing, and transporting a transparent flame resistant foil for producing a Pepper's Ghost Illusion.

BACKGROUND OF THE INVENTION

Video production techniques are well known in the art and are commonly used for creating lighting effects in motion pictures in the form of Pepper's ghost images. Typically a real object or an image of a subject is reflected by a partially-reflective foil that also allows a background scene to show through. From the perspective of a viewer the foil is invisible and the reflected image appears as a transparent "ghost" superimposed over the background scene.

A conventional foil used in the production of a Pepper's ghost illusion is made from a polymeric or plastic film. A preferred polymer is polyester which is used for its superior mechanical properties which are enhanced by stretching the film as it is produced. Conventional plastic foil burns easily when exposed to a naked flame and melts at high temperatures. Consequently, a conventional foil poses a safety risk and in the case of a fire the foil may melt and ignite and cause a rapid spread of flame and provide further fuel to the fire which will be dangerous to people in close proximity to the foil and may impede their safe evacuation.

Accordingly, a conventional foil should not be used as part of a lighting rig or stageset on music and theatre performances, television shows, nightclubs and other public places where local, national or international fire and safety regulations require the use of fire retardant materials. Furthermore, the response of a conventional foil to fire and heat may prevent a conventional foil being used in locations where the foil is likely to be in the proximity of heat-generating lighting or other such heat-generating equipment. This may prevent the erection of a Pepper's Ghost apparatus in confined spaces where close proximity of the foil to the lighting cannot be avoided.

In an attempt to overcome this problem manufacturers have added a fire resistant coating as an external layer on the outside of the transparent foil after the foil has been extruded or manufactured. However, the application of the external coating degrades the optical qualities of the transparent foil. In particular, the application of the external coating may result in a milky haze which makes the foil unsuitable for the Pepper's Ghost illusion. In order to be effective in delivering a quality image, the foil needs to be substantially transparent creating little or no dispersion of the light.

There are also problems associated with the present storage and transportation of the finished foil. Normally a foil is stored by placing a glue strip onto a roll core and sticking the end of the foil to the glued strip and then rolling the foil onto the core. However, the inventor has discovered that the glued strip causes a raised ridge in the foil that is carried through the rolls of the foil. This raised ridge results in deformities in the foil when it is unrolled making it unsuitable for use in creating or producing a Pepper's Ghost illusion, as the deformities/wrinkles will be evident to a viewer detracting from the illusion. The foil needs to be substantially wrinkle free and have very good optical and mechanical properties.

A number of associated problems are introduced due to the current methods of storing and transporting the foil. As described above, when the end of the foil is glued to the core of the roll, the foil is then rolled onto the core under tension, in order to prevent adjacent foil surfaces from sticking together an anti-stick filler is added during manufacture which aids in preventing the adjacent layers from sticking together. It has been found, in particular for foils comprising a flame retardant, that with a normal amount of anti-stick filler the haze of the foil is above acceptable levels of 5%. Such levels of haze once again making the foil unusable for creating lighting effects and in particular for producing the Pepper's Ghost Illusion.

Accordingly, it is desirable to provide a foil for creating lighting effects and in particular for producing the Pepper's Ghost Illusion, that has the required physical and optical properties such as being fire resistant to comply with local, national or international fire and safety regulations and/or allow the foil to be used in the proximity of heat-generating lighting or other such heat-generating equipment.

SUMMARY OF THE INVENTION

According to a first aspect, the present invention provides a method of producing a Pepper's Ghost Illusion comprising using a reflective and transparent foil formed from a polymeric composite, the polymeric composite including a flame retardant.

Passive fire protection is designed to protect elements of structure in the unfortunate event of a fire and also protect certain elements from actually catching on fire. Safety standards are laid down within the building regulations to which almost all buildings must adhere, these standards are there to ensure the protection of life, and not to protect the building. In order to meet these strict standards the present invention provides a flame resistant foil such that the Pepper's Ghost illusion may be produced at a location where local, national or international fire and safety regulations need to be met, or where they are likely to be used in the proximity to heat-generating lighting or other such heat-generating equipment. The flame resistant foil also should have the required optical properties required to produce the Pepper's Ghost illusion.

Preferably, the foil may have a haze of less than 10%, and optionally or preferably less than 5% and further optionally or further preferably less than 2%. The foil may be at least certified flame resistant to a European Class B rating under BS EN 13823 and BSEN 11925-2. The foil may be manufactured using a continuous extrusion process. The flame retardant may be added to the polymeric composite prior to the polymerisation process. The flame retardant may comprise an organic phosphorous compound monomer that is polymerised in the polymerisation process. It will be understood that other suitable flame retardants may be used. For example, halogenated flame retardants, such as those comprising brominated or chlorinated compounds. However, the applicant believes integration of phosphorous based flame retardants into the compound of the foil is easier than halogenated flame detardants. Other suitable flame retardants could be used, as long as the flame retardant can be substantially, and preferably fully dissolved, in the polymeric composite in order to make an optical clear foil suitable for use in a Pepper's Ghost illusion. The foil may be produced on a biaxially-oriented polyethylene terephthalate (BOPET) line.

According to a further aspect, the present invention provides a reflective and transparent foil formed from a polymeric composite comprising an organic phosphorous compound flame retardant and without an ultraviolet stabiliser and/or any white pigment.

The foil may be manufactured using an extrusion process and unlike conventional glass screens the foil of the current invention is less likely to shatter and poses less danger to crew installing it or working along side the foil. Unlike glass screens the foil may be installed into moving scenery without fear of it breaking as it is moved. This means that it is a very straightforward process to fly the system in and out of stages as required. The foil may be certified flame retardant to a Class B under European fire testing standards.

Preferably, the foil may be at least certified flame resistant to a European Class B rating under BS EN 13823 and BSEN 11925-2. The foil may be manufactured using an extrusion process. A flame retardant may be added to the polymeric composite prior to the polymerisation process. The flame retardant may comprise a monomer and preferably an organic phosphorous compound monomer that is polymerised in the polymerisation process. The flame retardant may result in a flame resistant foil having a haze of less than 10%, and optionally or preferably less than 5%, and further optionally or further preferably less than 2%. The foil may be produced from a thin membrane comprising a flame retardant polyester film. The foil may comprise a polyester flame resistant foil produced on a biaxially-oriented polyethylene terephthalate (BOPET) line.

According to a further aspect, the present invention provides a method of manufacturing a partially reflective transparent foil for producing a Pepper's Ghost Illusion, the method comprising: adding a flame retardant to a monomer mixture prior to polymerization causing polymerization of the monomer mixture including the flame retardant to result in a polymeric composition; and manufacturing the foil from the polymeric composition using an extrusion process.

By adding a flame retardant to the monomer mixture prior to the polymerization process produces a resulting foil that meets the optical requirements which allow the foil to be used in creating a Pepper's Ghost Illusion. For the foil to be used in creating this lighting effect the haze rating of the foil is preferably below 2% haze.

Preferably, the manufacturing process may further comprise stretching the foil to enhance the foils mechanical properties. The flame retardant may comprise an organic phosphorous compound containing monomer. The extrusion process may further comprise a biaxially-oriented polyethylene terephthalate (BOPET) line. Stretching the foil may comprise stretching the foil in both a longitudinal direction and in a transverse direction.

According to a still further aspect, the present invention provides a method of manufacturing a partially reflective transparent foil for use in creating lighting effects, the method comprising: adding an additive to a monomer mixture after the polymerization process causing a polymerized monomer mixture and the additive to result in a polymeric composition; manufacturing the foil from the polymeric composition using an extrusion process; and wherein the additive in the resultant foil is capable of being activated by an external source to create a lighting effect.

By placing an additive into the monomer after polymerization, and then allowing the additive to be activated by an external source to produce a lighting effect, substantially reduces the requirements for extra lighting equipment and still provides excellent optical and mechanical characteristics of the foil. This aspect of the invention provides a foil which may be used for more than just producing a real object or an image of a subject when reflected by a partially-reflective foil that also allows a background scene to show through. It allows for different backgrounds to be activated by using the additive or at least provide variations in the background being used.

Preferably, the additive may comprise any one of nanoparticles, light sensitive materials, pigments or dyes. The external source may comprise any one of ultraviolet light, any type of light source, electricity, chemicals or temperature. The additive may further comprise a light sensitive dye which when activated by the external source produces a lighting effect on an edge of the foil which resembles a trade mark or watermark.

According to a still further aspect, the present invention provides a reflective and transparent foil for use in creating lighting effects, wherein the foil is formed from a polymeric composite comprising an additive, wherein the additive in the polymeric composite is capable of being activated by an external source to create a lighting effect.

Preferably, the foil may be for use in creating a Pepper's Ghost illusion. The foil may be manufactured using a continuous extrusion process. The foil may be produced on a biaxially-oriented polyethylene terephthalate (BOPET) line.

According to a still further aspect, the present invention provides a method of processing a reflective and transparent foil, the processing comprising gluing the foil to a core around which the foil will be rolled, wherein the foil is attached to the core by spraying glue onto a surface of the core.

In order to produce a foil which may be used in a Pepper's Ghost Illusion the foil must be substantially wrinkle free. By spraying the glue onto the core to secure the end of the foil there is less chance that the glue produces a ridge or raised portion that may result in wrinkles or other deformities being formed in the roll of foil. Accordingly, in one embodiment, the glue is sprayed onto a surface of the core such that the glue does not produce a significant ridge in the foil. A significant ridge is formed when there is no uniform distribution of the glue on the core and a ridge is formed in the roll of foil which reduces the amount of foil on the roll which can be used to produce a lighting effect. A significant ridge may be a ridge that is formed in a foil that is more than 50% of the thickness of the foil. A typical foil thickness varying from 24 to 120 microns.

According to a still further aspect, the present invention provides a method of processing a reflective and transparent foil, the processing comprising gluing the foil to a core around which the foil will be rolled, wherein the foil is attached to the core by placing glue onto substantially all of the surface of the core such that the glue does not produce a significant ridge in the rolled up foil.

Preferably, the glue may be placed on the surface of a roll to form a uniform layer of glue covering substantially all of the surface of a uniform diameter core.

By placing glue onto the entire core further reduces the chance of a significant ridge being formed and therefore improves the mechanical and optical properties of the foil by producing a low haze and substantially wrinkle free foil.

According to a still further aspect, the present invention provides a method of processing a foil for a Pepper's Ghost illusion, the processing comprising manufacturing a reflective and transparent foil and winding the foil onto a core, wherein the length of the foil rolled onto the core is a predetermined length based on the amount of anti-stick filler in the foil.

In another embodiment the length of foil on the roll is also dependent upon the diameter of the core and the thickness of the foil. Preferably the foil length on a roll is between 10 to 40 m, the core diameter is between 120 mm to 350 mm and the thickness of the foil is between 24 to 120 microns.

By reducing the amount of foil which is rolled onto a core produces a lighter more easily handled roll of foil.

According to a still further aspect, the present invention provides a method of processing a foil, the processing comprising manufacturing a reflective and transparent foil, and winding the foil onto a roll under a tension, wherein the amount of tension on the foil is limited to producing an internal stress in the foil which is in the range of 10% to 40% and preferably or optionally less than 15% of the foil's ultimate yield stress.

By reducing the amount of tension in the rolled up foil aids in producing a foil which is free of deformities and has a good optical characteristic.

According to a still further aspect, the present invention provides a method of manufacturing a reflective and transparent foil, the manufacturing comprising adding an anti-stick filler as part of the foil extrusion process and optionally or preferably adding an anti-stick filler to the polymeric composite prior to the polymerisation process, wherein the anti-stick filler prevents adjacent foil surfaces from sticking to one another.

In order to prevent the rolled up foil from sticking to adjacent surfaces an anti-stick filler is used which prevents adjacent surfaces sticking together. It is also found that a reduced amount of filler has to be used when a fire retardant additive is used as using the normal amount of filler increases the haze percentage to an unacceptable level for a foil when used in creating a Pepper's Ghost Illusion.

By reducing the amount of anti-stick filler in order to obtain an acceptable amount of haze, it is also possible to reduce the amount of foil which is rolled onto a roll. This makes the roll easier to move and also easier to manipulate the foil on the roll. Subsequently by reducing the amount of foil on a roll also allows the amount of tension applied to the foil to be reduced when it is wound or unwound from the roll.

A further subsequent advantage of reducing the amount of foil and the tension on the roll of foil also allows the spraying of the glue onto the core to secure the end of the foil. By spraying there is less chance that the glue will produce a ridge or raised portion that may result in wrinkles or other deformities being formed in the roll of foil.

Preferably, the anti-stick filler may be calcium carbonate. The foil may be a flame retardant foil and the amount of filler is reduced in order to produce a foil with a haze percentage of less than 10%, and preferably or optionally less than 5%, and further preferably or further optionally less than 2%.

According to a still further aspect, the present invention provides a method of performing quality control testing of a reflective and transparent foil, the method comprising: unrolling a section of the foil from a core onto another core and placing the unrolled foil under tension; and transmitting a pattern through the foil and determining whether the foil reflects the pattern without significant distortion in order to test the optical quality of the foil.

By transmitting a pattern through a section of the foil and analysing the resultant pattern formed on the projected surface is used to identify surface defects and is a comparative test. It does not measure the back ground haze level but will show up optical contrasts. Thus it will identify wrinkles, marks coming from the extrusion dies or the rollers in the wind on machinery and rapid changes in transparency. It is a good quality control test which can distinguish the good from the bad but not the ultimate haze level.

Preferably, the pattern may comprise a number of rectangular coloured bars. In order to determine the optical quality of the foil the transmitted pattern may be checked to see that the pattern is not deformed.

According to a still further aspect, the present invention provides a roll of foil for producing a Pepper's Ghost Illusion comprising a reflective and transparent foil formed from a polymeric composite, the polymeric composite including a flame retardant.

According to a still further aspect, the present invention provides a roll of a reflective and transparent foil formed from a polymeric composite comprising an organic phosphorous compound flame retardant and without an ultraviolet stabiliser and/or any white pigment.

According to a still further aspect, the present invention provides a roll of a reflective and transparent foil for producing a Pepper's Ghost Illusion comprising, a flame retardant added to a monomer mixture prior to polymerization causing polymerization of the monomer mixture including the flame retardant to result in a polymeric composition; and wherein the foil is manufactured from the polymeric composition using an extrusion process.

According to a still further aspect, the present invention provides a roll of a reflective and transparent foil for use in creating lighting effects, wherein the foil is formed from a polymeric composite comprising an additive, wherein the additive in the polymeric composite is capable of being activated by an external source to create a lighting effect.

According to a still further aspect, the present invention provides a roll of foil comprising, a reflective and transparent foil rolled around a core, wherein the foil is attached to the core by spraying glue onto a surface of the core.

According to a still further aspect, the present invention provides a roll of foil, the roll comprising a reflective and transparent foil glued to a core around which the foil will be rolled around, wherein the foil is attached to the core by placing glue onto substantially all of the surface of the core such that the glue does not produce a significant ridge in the rolled up foil.

According to a still further aspect, the present invention provides a method of processing a foil for a Pepper's Ghost illusion, the processing comprising manufacturing a reflective and transparent foil and winding the foil onto a core, wherein the length of the foil rolled onto the core is a predetermined length based on the amount of anti-stick filler in the foil.

In another embodiment the length of foil on the roll is also dependent upon the diameter of the core and the thickness of the foil. Preferably the foil length on a roll is between 10 to 40 m, the core diameter is between 120 mm to 350 mm and the thickness of the foil is between 24 to 120 microns.

According to a still further aspect, the present invention provides a roll of foil comprising a reflective and transparent foil, wherein a tension is applied to the foil on the roll, wherein the amount of tension applied to the roll of foil is limited to producing an internal stress in the foil which is in the range of 10% to 40% and preferably or optionally less than 15% of the foil's ultimate yield stress.

According to a still further aspect, the present invention provides a roll of foil comprising a reflective and transparent foil, the foil comprising an anti-stick filler added during the foil extrusion process and optionally or preferably an anti-stick filler added to the polymeric composite prior to the polymerisation process, wherein the anti-stick filler prevents adjacent foil surfaces from sticking to one another.

According to a still further aspect, the present invention provides a roll of a reflective and transparent foil comprising performing a quality control test to determine an optical quality of the roll of foil, the quality control test comprising: a section of the foil unwound from a core under tension; and a pattern transmitted through the foil to determine whether the foil reflects the pattern without significant distortion.

A roll of foil is produced which may be used where local, national or international fire and safety regulations require the use of fire retardant materials, or where they are likely to be used in the proximity to heat-generating lighting or other such heat-generating equipment. By removing the UV stabiliser and/or the white pigment produces a roll of foil that meets the requirements for producing a Pepper's Ghost Illusion.

The various features of novelty which characterise the present invention are pointed out with particularity in the claims annexed to and forming part of this disclosure. For a better understanding of the present invention, its operation, advantages and specific objects attained by its use, reference should be had to the accompanying drawings and descriptive matter in which preferred embodiments of the invention are illustrated and described.

DESCRIPTION OF PREFERRED EMBODIMENT

Figure 1:
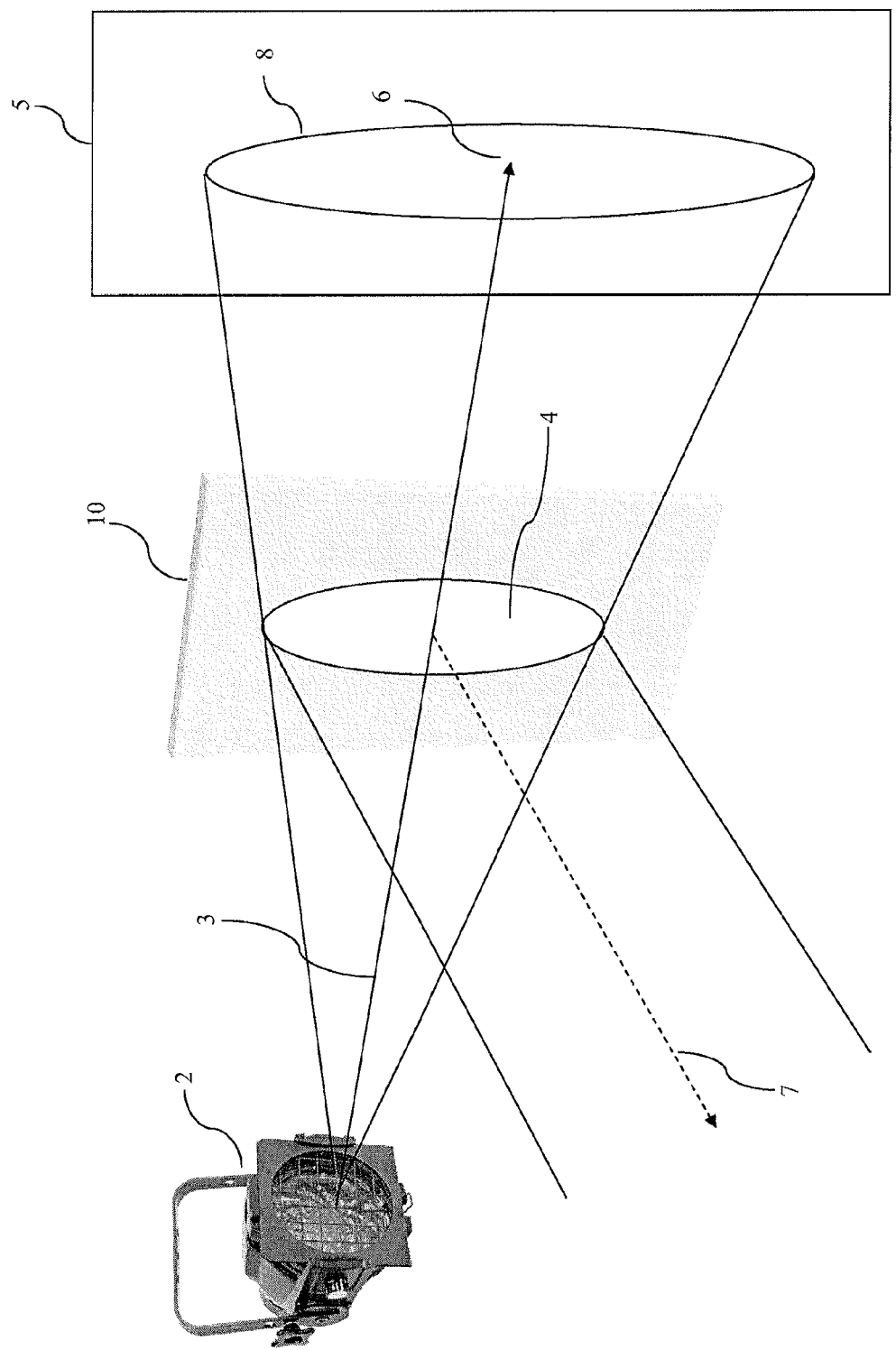
FIG. 1 is a schematic of a foil according to an embodiment of the present invention used when the foil is suspended from a roof.

To be effective in delivering a quality image, the image to be projected into the foil panel 10 and reflected should be projected as high definition (HD) video and if the projected image is to be a human figure, then the mirror or foil 10 should be capable of producing a life size image. One of the requirements of a foil panel 10 which is required in order to reproduce a quality image for a Pepper's Ghost illusion is the clarity of the foil 10. In order to produce a good quality illusion the foil 10 should have less than 10% haze, and preferably less than 5% haze and still further preferably less than 2% haze. This means that any foil 10 which has more than 10% haze is not suitable for reproducing the Pepper's Ghost illusion. For example, any screen or foil 10 which, when manufactured exhibits a blurred image or a somewhat milky haze of greater than 10% haze makes the foil unsuitable for the Pepper's Ghost illusion. In order to be effective in delivering a quality image, the image to be projected into the foil 10 panel and reflected should be projected as high definition (HD) video.

As described above haze is the scattering of light by a film that results in a cloudy appearance or poorer clarity of objects when viewed through the film. More technically, haze is the percentage of light transmitted through a film that is deflected more than 2.5° (degrees) from the direction of the incoming beam.

The percentage haze is measured using a specimen of foil 10 (under tension) which is placed in the path of a light beam. Light that passes through the foil 10 enters an integrating sphere, in which a photo detector measures the total light transmitted by the foil 10 and the amount of transmitted light that is scattered by more than 2.5°. Haze is the percentage of total transmitted light that is scattered by more than 2.5° and is calculated by the following equation:

$$\text{Haze \%} = \frac{T_d}{T_t} \times 100$$

where
$T_d$=Scattered transmitted light
$T_t$=Total transmitted light ($T_o$+$T_d$)
$T_o$=Transmitted light that does not deviate >2.5°

In its most basic form, the reflective and transparent foil 10 is formed from a polymeric composite comprising a flame retardant which produces a foil 10 that is suitable for use in creating lighting effects and also the foil 10 does not contain any UV stabilisers or any white pigment. The UV stabilisers and the white pigment are removed to aid in the production of a foil 10 which is capable of producing a lighting effect and in particular, a Pepper's Ghost Illusion. For example, a foil 10 which contains either or both of the UV stabiliser and the white pigment would not be able to be used to reproduce the Pepper's Ghost Illusion. The foil 10 is a flame resistant film produced with a phosphorous flame retardant which is polymerised in the polyester chain in the polymerization process. The flame retardant is non-halogenated and non-migrating. The flame resistant polyester is then processed into a polyester foil on a biaxially-oriented polyethylene terephthalate (BOPET) line where the properties of the material are enhanced. The process will be further described below.

A polymeric composite is taken to mean any of the combinations or compositions that comprise two or more materials, at least one of which is a polymer. By combining a polymer with another material, such as glass, carbon, or another polymer, it is often possible to obtain unique combinations or levels of properties. Typical examples of synthetic polymeric composites include glass-, carbon-, or polymer-fiber-reinforced thermoplastic or thermosetting resins, carbon-reinforced rubber, polymer blends, silica-reinforced or mica-reinforced resins.

The addition of the flame retardant allows the flame resistant foil 10 to be used as part of a lighting rig or stageset on music and theatre performances, television shows, nightclubs and other public places where local, national or international fire and safety regulations require the use of fire retardant materials. Also such a flame resistant foil 10 can be used where they are likely to be in the proximity to heat-generated lighting or other such heat-generating equipment.

The transparent-reflective foil 10 of the present invention is essentially the same as a beam splitter. Those in the optical coating art will understand the vast variations possible for the transparent-reflective foil 10 in regard to its substrate, coating, and manufactured process. Plastic and glass substrate foils 10, as well as stretched polyester, have been successfully used for the transparent-reflective foil 10. The transparent-reflective foil 10 can range from a custom blend of optical coatings on a transparent substrate for superior reflectivity and transmissivity all the way down to off-the-shelf one-way mirrors with inconsistent and poor optical qualities. Also, the reflectivity and transmissivity, as well as other optical qualities of the transparent-reflective flame retardant foil 10, can be adjusted as required.

The transparent-reflective foil 10 should have sufficient transparency to allow a camera to capture a quality image from the opposite side and to allow projected light to pass through without substantial reflection. The quality image is required for the Pepper's ghost illusion. The Pepper's ghost is an illusionary technique used in theatre and in some magic tricks. Using a plate glass or film 10 and special lighting techniques, it can make objects seem to appear or disappear, or make one object seem to "morph" into another. The transparent-reflective foil 10 must also be substantially reflective so that a quality image is reflected from the front projection screen. Antireflective coatings can be applied as needed to suppress unwanted reflections from any of the optical surfaces involved. On the back side of the transparent-reflective foil 10, opposite the viewing side, an antireflection coating can serve to eliminate the ghosting effect apparent with many types of transparent-reflective panels. Despite the vast variations possible for the transparent-reflective foil 10, the property of being both reflective and transparent remains the single most important constant.

One known example for manufacturing a transparent-reflective foil 10 is to pressurise or depressurise a thin plastic membrane into a required shape. By using a multi-layer panel having a curved reflecting or transmitting facing layer, which may be produced by blowing a thin plastic membrane held in a frame and then backed by a polyurethane layer supported by fibre glass to retain the shape of the thin membrane while being either pressurised or de-pressurised by a pressure chamber. Obviously there are other methods which can be used to produce the foil 10 without departing from the scope of the invention, the present method is used to provide an example of one such method.

As described above the foil 10 is produced from a flame resistant polyester film. Flammability is defined as how easily something will burn or ignite, causing fire or combustion. The degree of difficulty required to cause the combustion of a substance is subject to quantification through fire testing. Internationally, a variety of test protocols exist to quantify flammability. The ratings achieved are used in building codes, insurance requirements, fire codes and other regulations governing the use of building materials as well as the storage and handling of highly flammable substances inside and outside of structures and in surface and air transportation.

Materials can be tested for the degree of flammability and combustibility in accordance with the respective countries standards. This includes the corresponding British standard BS 476 for testing passive fire protection systems, as well as some if its constituent materials. In the European harmonization of standards to classify materials according to their fire resistance the following classifications have been agreed:

A1 (Non-combustible);
A2 (Limited combustibility);
B;
C;
D;
E; or
F (No fire resistance).

To obtain a classification for a high rating in products used for construction, two tests are required. To obtain Euro Class B the product must meet a single flame test according to BS EN 11925-2 and a single burning item test according to BS EN 13823 for the product to be used in public spaces.

Preferably the flame retardant foil 10 according to the present embodiment is certified flame retardant to Class B. The foil 10 can therefore be used in any area were a B rating is required. The foil 10 is also certified as Euro Class B rating under BS EN 13823 and BS EN 11925-2. The UL rating is VTM-2. As the material is relatively thin it is classified under UL 94 for thin materials (ie materials that can be wound around a mandrel).

As shown in FIG. 1 a highly reflective and transparent foil 10 may be rigged or suspended in panels or sheets or pieces or fragments with or without the use of a frame or tensioning devices (not shown). At its most simple, a single sheet of foil 10 may be hung or suspended freely or in a frame in such a way as to be in the path of one or more lights. FIG. 1 shows a sheet of foil 10 suspended from a roof, lit with a light source 2 along light path 3 such that the light emitting from the fixture hits the sheet of foil 10 creating an image 4. Part of the light is transmitted through the foil 10 onto another surface 5 along light path 6 creating a further, enlarged image 8, and part of the light is reflected off the front of the foil 10 along light path 7. The Applicants co pending application numbers WO 2005/096095 for a Projection Apparatus and Method for Pepper's Ghost Illusion and EP 0808325.5 for Projection Screen and Method of Construction are hereby incorporated by reference. The respective applications provide details of the frame and tensioning devices used to produce a wrinkle free screen.

Being able to see the shape of a light beam 2 as it passes through the plane of an almost invisible foil 10 creates the impression of a 2 dimensional projection using a screen invisible to the viewing audience. This allows for high quality projection of light and images because the very thin nature of the highly reflective, transparent foil 10 with a reflective coating of high optical quality will not create double reflections within the image such as when glass is used, and does not allow for the path of the light beam to be seen through the air such as when a light beam passes through smoke.

This characteristic is unique because it creates a high quality image, but does not readily identify the source of any light used to create an effect on the foil 10, so there is the possibility to obscure the source and mystify the observers. It furthermore removes the disadvantage experienced with traditional screens that when the screen is not needed for viewing images, either it must be somehow moved or removed (for example a roller screen may be deployed), or it requires a lighting effect or holding image to be placed upon it in order to avoid having an obvious blank surface visible to an audience.

In one example, the foil 10 may be held at any angle between 0 and 90 degrees with respect to a mounting device which can be located on or near the ceiling of a studio, or preferably at 45 degrees to the mounting device in a frame with tensioning devices employed to smooth out the surface of the foil 10. A 'Pepper's Ghost' effect or illusion may be created, allowing a reflection of the light beams to appear behind the foil 10. This is further described below and shown in FIG. 3.

Further effects may be created by the light being projected from different angles and being transmitted, reflected and refracted by the foil 10 or a coating applied on one or both sides of the foil 10 or by an active element held within the foil 10. This may cause the creation of light beams of a colour other than the original source part of the beam due to a prismatic effect on the incident light, and the component wavelengths being separated out in the manner of white light hitting a prism in such a way as a rainbow may be observed in the light coming out of the prism. This can also be created by distorting the foil 10 to cause the light beams to separate into beams of different colours.

The fire retardant nature of the material allows for the placement of the foil 10 in areas in which non fire retardant articles would pose a risk, and the extreme lightness allows for rigging in positions which may not be available had a frame or truss been required to deploy the foil 10.

Figure 2:
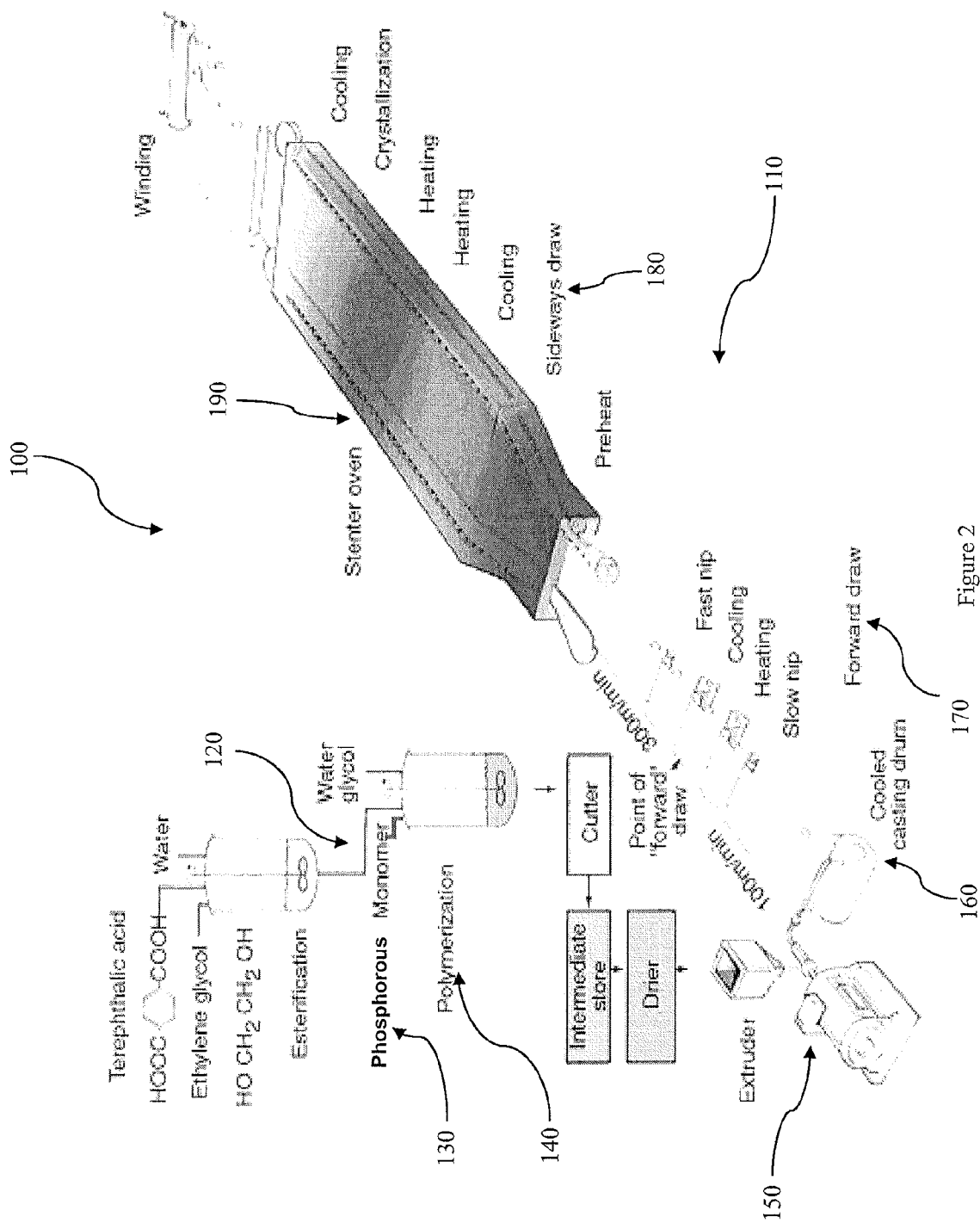
FIG. 2 is a schematic of the method of manufacturing a flame resistant foil according to an embodiment of the present invention.

FIG. 2 shows a typical manufacturing process 100 of a polyester foil 10 on a biaxially-oriented polyethylene terephthalate (BOPET) line 110. The manufacturing process begins with a molten polyethylene terephthalate (PET) 120 being combined with a monomer 130 prior to the polymerization process 140. The monomer 130 may be selected from one or more organic phosphorous compounds. It is the phosphorous containing monomer 130 which gives the foil 10 the fire retardant quality without degrading the optical characteristics of the foil 10. By placing the monomer 130 in the polymerisation process 140 means that the foil 10 keeps the optical characteristics which are required when the foil 10 is used in the Pepper's Ghost illusion or for creating any type of lighting effect.

The foil 10 is then extruded 150 onto a chill roll 160, which quenches it into a solid state. It is then biaxially oriented by drawing. The most common way of doing this is the sequential process, in which the foil 10 is first drawn in the machine direction 170 using heated rollers and subsequently drawn in the transverse direction 180, i.e. orthogonally to the direction of travel, in a heated oven 190. It is also possible to draw the foil 10 in both directions simultaneously, although the equipment required for this is somewhat more elaborate. Draw ratios are typically around 3 to 4 in each direction.

Once the drawing is completed, the foil 10 is "heat set" or crystallized under tension in the oven at temperatures typically above 200° C. The heat setting step prevents the foil 10 from shrinking back to its original unstretched shape and locks in the molecular orientation in the foil 10 plane. The orientation of the polymer chains is responsible for the high strength and stiffness of biaxially oriented PET film, which has a typical Young's modulus of about 4 GPa. Another important consequence of the molecular orientation is that it induces the formation of many crystal nuclei. The crystallites that grow rapidly reach the boundary of the neighboring crystallite and remain smaller than the wavelength of visible light. As a result, biaxially oriented PET foil 10 has excellent clarity, despite its semicrystalline structure.

If it were produced without any additives, the surface of the foil 10 would be so smooth that layers would adhere strongly to one another when the foil 10 is wound or unwound, similar to the sticking of clean glass plates when stacked. To make handling possible, microscopic inert inorganic particles or an anti-stick filler are usually embedded or added to the PET to roughen the surface of the foil 10. This makes the foil 10 ideal for use in providing the Pepper's ghost illusion. The foil 10 is wound up from the extrusion stretching ovens 190 onto steel master cores (not shown). These cores weigh between 2 to 3 tonnes and can be up to 10 meters long.

The foil 10 on the master cores which require mechanical lifting devices to handle is then unwound onto lighter transportation cores in foil lengths of between 10 to 40 meters. These cores are typically a uniform diameter roll and are made from cardboard, but could also be made from carbon fibre or glass fibre composites. The core with the foil 10 wound on, weigh between 40 to 100 kg and with only 40 meters of foil 10 on the roll are easy to handle.

It is also possible to include further additives after the polymerization process to produce a partially reflective transparent foil 10 capable of creating a lighting effect when activated by an external source. These additives can include nano-particles, light sensitive materials, pigments or dyes. For example, another possible additive is a light sensitive dye which when activated by the external source to produce a lighting effect on an edge of the foil 10, produces an effect which resembles a Trade Mark or watermark. This means the manufacturer has a simple way of identifying his product by including the companies Trade mark in the manufacturing process.

A lighting effect can simply be the transmission or reflection of an image as described above in relation to the Pepper's Ghost illusion. Also as described above a lighting effect may be created by the light being projected from different angles and being transmitted, reflected and refracted by the foil 10 or a coating applied on one or both sides of the foil 10 or by an active element or additive held within the foil 10. This may cause the creation of light beams of a colour other than the original source part of the beam due to a prismatic effect on the incident light.

A different type of lighting effect may be created when the additive in the polymeric composite is a liquid crystal layer which when activated is capable of creating a lighting effect. For example, liquid crystals find wide use in liquid crystal displays, which rely on the optical properties of certain liquid crystalline substances in the presence or absence of an electric field. In a typical device, a liquid crystal layer (typically 10 μm thick) sits between two polarisers that are crossed (oriented at 90° to one another). The liquid crystal alignment is chosen so that its relaxed phase is a twisted one (Twisted nematic field effect). This twisted phase reorients light that has passed through the first polarizer, allowing its transmission through the second polarizer (and reflected back to the observer if a reflector is provided). The device thus appears transparent. When an electric field is applied to the LC layer, the long molecular axes tend to align parallel to the electric field thus gradually untwisting in the centre of the liquid crystal layer. In this state, the LC molecules do not reorient light, so the light polarized at the first polarizer is absorbed at the second polarizer, and the device loses transparency with increasing voltage. In this way, the electric field can be used to make a pixel switch between transparent or opaque on command.

Figure 3:
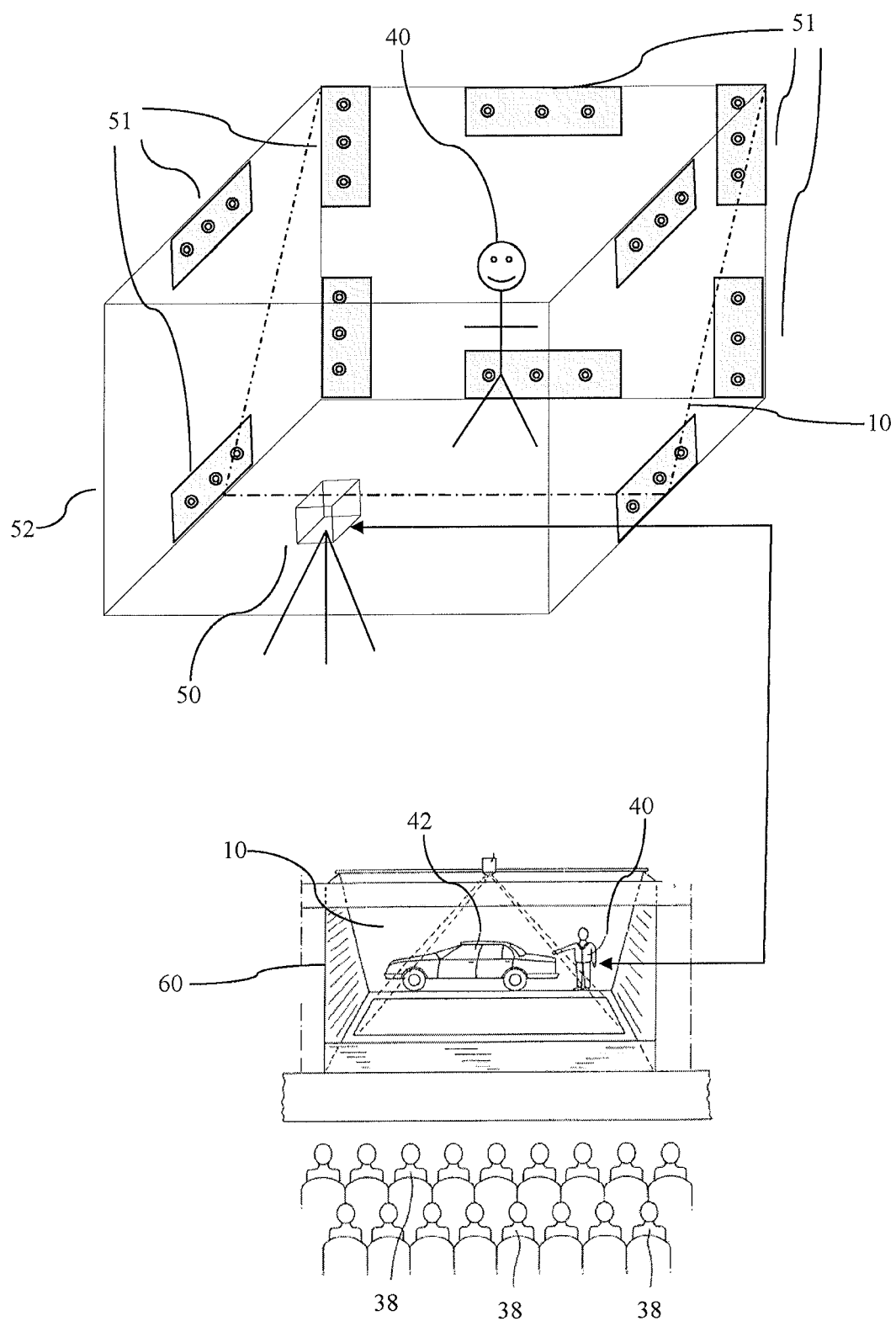
FIG. 3 is a schematic of a Pepper's Ghost illusion according to an embodiment of the present invention.

FIG. 3 shows the use of a foil 10 used to produce the Pepper's ghost illusion. In this example a studio 52 is located remotely from a stage or theatre 60. The studio 52 comprises a stage area or platform or a riser forming a stage platform on which the subjects 40 or performers are placed for greater visibility. For example a stage platform (riser) 47 approximately 1' high extends across the width of the studio 52 (generally 9' if arranged at one end of the trailer, or 20 ft-30 feet wide if arranged lengthways across the trailer). Preferably steel deck stage or similar material gives the subject 40 a spatial boundary to work within and should match the dimensions of the show or theatre stage 60 or the camera 50 lens frame area, whichever is smaller. The camera 50 lens frame limits should be explained to the filmed subject 40 and markers set for him to see, though not visible to the camera 50 lens. Although the height of the studio 52 need not be the same as the show stage 60, the difference is an essential figure in calculating the height of the camera 50. The stage platform also avoids having to set the camera 50 on the studio floor to achieve the correct height.

The studio 52 is used to produce video and audio performances wherein the studio 52 may allow a real time communication of a two-way interaction between two or more subjects 40 located remotely of one another. In order for the Pepper's ghost illusion to work, the viewer or audience 38 must be able to see into the main room or theatre 60, but not into the hidden mirror room or studio 52. The edge of the foil 10 may be hidden by a cleverly designed pattern in the floor. In this case the two rooms are located remotely from one another. The studio 52 is located remotely from the theatre or stage 60. Both rooms may be identical mirror-images; this approach is useful in making objects seem to appear or disappear, however it is not required that both rooms are identical if the room or studio 52 in which the subject 40 is completely black inside so as to not include anything other than the subject 40 in the captured image. This effect can also be used to make an actor reflected in the foil 10 appear to turn into an actor behind the foil 10 (or vice versa). This is the principle behind the Girl-to-Gorilla trick found in many haunted houses. The mirror room may instead be painted black (as in this case with the studio 52), with only light-coloured objects in it. When light from light sources 51 is cast on the objects 40, they reflect strongly in the foil 10, making them appear as ghostly images 40 superimposed in the visible room or theatre 60.

The lighting of the filming subject 40 may be of any type suitable for providing sufficient illumination for a high definition (HD) image capture. A number of lighting assemblies 51 are located in the studio 52 suitable for presenting an environment of immersive ambience to the audience 38 in a viewing venue or theatre 60 thus producing a compelling mixture of colour and contrast on stage and correctly illuminated live talent on stage and audiences for sharp, realistic signal feeds and audience signal feeds.

In FIG. 3 a presenter or subject 40 resides behind an inclined, reflective and transparent foil 10 onto which an image of, for example, a motor vehicle 42 is projected. The location of the subject or presenter 40 behind the projected image has a number of inherent advantages over systems where the presenter 40 stands in front of a screen, not least of which is that the presenter 40 does not obscure the projected image when walking across the projected image. Additionally, the use of an inclined foil 10 results in a viewer or audience 38 of the image perceiving the image as having depth rather than merely being a two dimensional image, for example where a motor vehicle 42 is seen to rotate upon a turntable. The projection of an image upon a partially reflective foil 10 such that is observable by a viewer 38 positioned in front of the screen is known as the "Peppers ghost" illusion.

In the manufacture of foils 10 it is possible to improve or change foil 10 characteristics with additives or fillers added during the manufacture of the foil 10. The addition of additives and fillers can change the transparency and can be used to create different lighting effects. Another method of manufacturing a foil 10 to create different lighting effects is to use multi-layer films. In general multi-layer films depend upon the number of extruders feeding a film line. Each extruder provides one layer. For example, in a BOPET line 110 three extruders are common, however in FIG. 2 only one extruder 150 is shown but there can be more. The advantage of a BOPET line 110 for foil production is the line width and the enhanced mechanical properties of the foil 10.

Each of the extruders 150 may or may not contain a different polymer formulation. Where the formulation is similar the different extruders are used to increase the productivity of the line. Most of the foil 10 production is application driven requiring different formulations for each layer. The formulation for the different layers often contain pigments or dies to change the colour of the foil 10 or may contain further additives or fillers to change the properties of the final foil 10 product. Multi-layer foil 10 with different colours and different colour densities can be easily produced to create different lighting effects in addition to the flame retardant properties.

Coatings applied during foil production or applied after production can also be used to change the colour or transparency of the foil and again may assist in creating different lighting effects. For example, PET foils 10 are often metalized under vacuum conditions in special purpose machinery to provide high gas barrier levels. The same vacuum metalizing process is also used to achieve special optical properties and a metallic look for decorative applications. Again this technology would apply to the development of foils 10 for creating special lighting effects. Aluminium is the metal most commonly used but other metals can also be easily applied.

There are also two further processes which can be used to produce foil 10 for use in producing special lighting effects. These processes are Blown foil and Cast foil where often 5 or 6 extruders are used to build up a multi layer film. In a blown foil a plastic resin is heated and while it is still hot, an extruded tube is blown up like a balloon, with compressed air. This stretches the plastic and makes it thin. The balloon is made long enough to allow the plastic to cool. The end of the balloon is pinched together by rollers, to hold the air in and make the foil flat. The flat tube is then wound on to a steel master core. In a cast foil the polymer is squeezed between rollers, chilled and wound up as a thin plastic sheet or film.

As described above the foil 10 is wound up from the extrusion stretching oven 190 onto a steel master core. In order to prevent adjacent layers from sticking together an anti-stick filler is added to either the foil extrusion process or by adding anti-stick filler to the polymeric composite prior to the polymerisation process. Initially when a flame retardant was added to the foil 10 with the normal amounts of anti-stick filler the haze increased above the acceptable level of 2% thus the anti stick filler amount had to be reduced for the production of a foil 10 for use in creating lighting effects and in particular for producing the Pepper's Ghost Illusion.

Due to the reduced amounts of anti-stick filler required in order to achieve the percentage haze to less than 2% means that the length of foil 10 on each master core has been reduced to between 400 to 800 meters. Due to the size of the roll of foil 10 on the master core mechanical lifting devices are required in order to handle and manipulate the steel cores. The foil 10 is then unwound from the steel master core onto lighter storage/transportation cores in lengths of between 5 m to 100 m and preferably in the range of 10 m to 40 m.

These transportation cores are typically made from cardboard and weigh between 40 kg to 100 kg and with typically only 40 meters of foil 10 wound onto the transportation core they are easy to handle. The transportation cores could also be made from carbon fibre or glass fibre composites. The transportation cores range in diameter from 120 mm to 350 mm. The diameter of the transportation core and the wall sections of the core are related to minimise the deflection of the cores in the unwinding machinery and for transportation.

As described above, in order to store and/or transport the final foil 10, the foil 10 is rolled from the master core onto a transportation core under tension. The tension on the foil is limited to producing an internal stress in the foil which is between 10% to 40% or preferably less than 15% of the foil's ultimate yield stress. The core may be cylindrical or any other shape which allows the foil 10 to be safely stored. For example a cardboard core with a smooth cylindrical surface may be used. The storage onto the transportation cores introduces further problems.

When the foil 10 is attached to the transportation core the end of the foil 10 is glued to the core. Traditionally this glue is applied to the core in a line stretching across the core. This introduces a ridge into any foil 10 surface which is rolled onto the core. Due to the optical characteristics required for the foil (preferably haze of <2%) the ridge of glue across the core is not an option.

In order to overcome this problem a surface of the core is sprayed with glue or more preferably the whole of the cylindrical core has glue applied to the surface and the foil 10 is wound onto the core under tension. Due to the increase in surface area of the glue applied to the core, means that a significant ridge is not formed in the foil 10. Typically a significant ridge is one that is more than 50% the thickness of the foil 10, for a foil 10 which has a thickness which will vary from 24 to 120 microns. This ensures that any foil 10 rolled onto a core (other than the section which is glued) is substantially wrinkle free and the resultant foil 10 is able to be used for producing the Pepper's Ghost Illusion. Accordingly, in one embodiment, the glue is sprayed onto a surface of the core such that the glue does not produce a significant ridge in the foil. In a further embodiment the foil 10 is glued to a core around which the foil 10 is rolled. The foil 10 is attached to the core by placing glue onto substantially all of the surface of the core such that the glue does not produce a significant ridge in the rolled up foil 10. Therefore, the glue is placed on the surface of a roll to form a uniform layer of glue covering substantially all of the surface of a uniform diameter transportation core.

The foil 10 is rolled onto a transportation core and the roll of foil 10 is then stored or is ready for transportation. The roll size is kept to a reasonable size to enable the roll to be easily moved and manipulated. For example, the amount of foil 10 rolled onto a roll is typically in the range of 5 m to 100 m and preferably in the range of 10 m to 40 m. Also, by reducing the size of the roll of foil 10 also enables the tension applied to the foil 10 to be reduced. The tension on the foil is limited to producing an internal stress in the foil which is between 10% to 40% or preferably less than 15% of the foil's ultimate yield stress.

The reduced tension in conjunction with the glue being sprayed to a surface or the whole of the transportation core means that the first few metres of the foil 10 are not useable. By also reducing the size of the actual amount of foil 10 rolled onto the cores also aids in reducing the effects mentioned above. However, the remaining foil 10 rolled onto the core does not have the ridge indented into the surface of the foil 10 and therefore meets the optical requirements for producing a foil 10 for use in creating lighting effects and in particular for producing a foil 10 for use in the Pepper's Ghost Illusion.

Another problem introduced by the rolling of the foil 10 onto cores (ie steel master core and the transportation core) is that adjacent foil surfaces can stick together when the foil 10 is wound or unwound from the core. In order to prevent the foil 10 from sticking to the adjacent surfaces as it is wound or unwound from the cores, an anti stick filler is used. By adding anti-stick filler as part of the foil extrusion process or by adding anti-stick filler to the polymeric composite prior to the polymerisation process prevents adjacent foil surfaces from sticking to one another.

A typical filler used is calcium carbonate, however any known filler capable of being an anti-stick filler and still provide the required optical and mechanical properties may be used.

Also another problem which had to be overcome was when the flame retardant was added to the foil 10 with the normal amounts of anti-stick filler the haze increased above the acceptable level of 2% thus the anti stick filler amount had to be reduced for the production of a foil 10 for use in creating lighting effects and in particular for producing the Pepper's Ghost Illusion.

Therefore in order to produce a roll of foil 10 for a Pepper's Ghost illusion required the amount of anti-stick filler and the length of foil wound onto the core to be taken into consideration. When the foil 10 is wound onto a core, the length of the foil rolled onto the core is a predetermined length based on the amount of anti-stick filler in the foil.

In order to test the optical characteristics, the foil 10 is unrolled under tension. The mechanical tension ensures that the foil 10 is as flat and wrinkle free as possible. A light pattern is displayed using an amplified light source and projected via a bounce screen or reflected from an LED wall. The amplified light source is used to show up any artifacts such as the 'moray' (rainbow of colours) of the projected image. Preferably the pattern is a number of coloured bars which are transmitted through the foil 10. The transmitted image is then checked for two components of the coloured bar image. Firstly the transmitted image is checked that a perfect rectangle is formed and secondly that the coloured bars line up vertically and horizontally. This optical test is used to identify surface defects and is a comparative test. It does not measure the back ground haze level but will show up optical contrasts. Thus it will identify wrinkles, marks coming from the extrusion dies or the rollers in the wind on machinery and rapid changes in transparency. It is a good quality control test which can distinguish the good from the bad but not the ultimate haze level.

In order to determine and calculate the percentage of haze in a test piece of foil 10 the following available tests can be used. For example percentage haze can be measured by a method based on ASTM-D 1003-52. It is also possible to use a haze meter which is an instrument for measuring visibility or the transmission of light through a medium. For example, the percentage haze is measured using a specimen of foil 10 (under tension) which is placed in the path of a unidirectional light beam is directed onto the foil 10 specimen. After it enters an integrating sphere, a photo detector measures the total light transmitted by the foil 10 and the amount of transmitted light that is scattered more than 2.5°. Haze is the percentage of total transmitted light that is scattered by more than 2.5°.

As described above the foil 10 is stored or transported on a transportation core. To produce a foil 10 capable of being used for a Pepper's Ghost illusion the foil 10 must not be wrinkled or damaged while stored. The roll of foil 10 consists of a roll of reflective and transparent foil 10. The foil 10 being formed from a polymeric composite comprising a monomer and preferably an organic phosphorous compound flame retardant. The foil 10 preferably does not contain an ultraviolet stabiliser and/or any white pigment.

The foil 10 is wound up from the extrusion stretching ovens 190 onto steel master cores. These cores weigh between 2 to 3 tonnes and can be up to 10 meters long. The foil 10 on the master cores which require mechanical lifting devices to handle is then unwound onto lighter transportation cores in foil lengths of between 10 to 40 meters.

The foil 10 is attached to the transportation core by spraying glue onto a surface of the core. The glue must not produce a raised section in the rolled up foil. If there is a raised section this will be superimposed onto the rest of the wound up foil 10 and renders the foil un-useable for a Pepper's Ghost Illusion. In order to make the roll of foil easier to handle the amount of foil 10 wound onto the roll is reduced and subsequently the amount of tension applied to the foil 10 when rolled up onto the core is also reduced. This ensures that the foil 10 rolled onto the roll does not have any deformities or wrinkles or is substantially free of deformities and wrinkles.

In order to prevent the rolled up foil 10 from sticking to adjacent foil 10 surfaces, an anti-stick filler is added as part of the foil extrusion process or the anti-stick filler is added to the polymeric composite prior to the polymerisation process. This prevents the foil 10 from sticking to the adjacent foil 10 surface and prevents any deformities forming in the foil 10. Also, the amount anti-stick filler which is used is important, especially when the foil 10 includes a fire retardant. When the fire retardant was added to the foil 10 and the anti-stick filler was added, this raised the percentage haze in the roll of foil 10 to an unacceptable level. In order to produce the Pepper's Ghost Illusion a haze of <2% is required. To ensure this figure is met the amount of anti-stick filler added to the foil 10 had to be reduced.

Finally the roll of foil 10 requires testing to ensure that the roll of foil 10 meets the required optical qualities required for a foil for use in producing the Pepper's Ghost Illusion. The quality control testing of the roll of foil 10 is carried out by unrolling a section of foil 10 while under tension and transmitting a pattern through the foil in order to test the optical quality of the foil. The transmitted image determines the quality of the foil 10.

Although the present invention has been illustrated and described with respect to exemplary embodiment thereof, it should be understood by those skilled in the art that the foregoing and various other changes, omission and additions may be made therein and thereto, without departing from the scope of the invention. Therefore the present invention should not be understood as limited to the specific embodiment set out above but to include all possible embodiments which can be embodied within a scope encompassed and equivalent thereof with respect to the features set out in the appended claims.

The invention claimed is:

1. A method of producing a Pepper's Ghost Illusion comprising:
   providing a roll of reflective and transparent foil comprising:
      a polyester film in which flame retardant is at least partially dissolved therein; and
      an anti-stick filler added during a foil extrusion process such that the anti-stick filler reduces a tendency of adjacent foil surfaces from sticking to one another; and
   reflecting an image of a subject in the foil such that the image appears as a Pepper's Ghost.

2. The method according to claim 1, wherein, in providing the foil, the foil has a haze of less than 10%.

3. The method according to claim 1, wherein the foil is at least certified flame resistant to a European Class B rating under BS EN 13823 and BSEN 11925-2.

4. The method according to claim 1, wherein providing a reflective and transparent foil further comprises:
   providing the flame retardant comprises as an organic phosphorous monomer; and
   polymerizing the flame retardant in a polymerisation process.

5. The method according to claim 1, wherein, in providing the foil, the foil is a biaxially-oriented polyethylene terephthalate (BOPET) foil.

6. The method according to claim 1, wherein, in providing the foil, the foil is formed from a monomer mixture comprising neither ultraviolet stabiliser nor white pigment.

7. The method according to claim 1, wherein, in providing the foil, the foil is formed from polymerisation of a monomer mixture, the monomer mixture comprising the flame retardant.

8. The method according to claim 1, wherein, in providing the foil, the foil is rolled around a core, wherein the foil is attached to the core by spraying glue onto a surface of the core.

9. The method according to claim 8, wherein the foil is attached to the core by placing glue onto substantially all of the surface of the core such that the glue does not produce a significant ridge in the rolled-up foil.

10. The method according to claim 1, wherein the foil is tensioned on the roll, such that an internal stress in the foil is in the range of 10% to 40% of the foil's ultimate yield stress.

11. The method according to claim 1, wherein, in providing the foil, the flame retardant is fully dissolved therein.

12. The method according to claim 1, wherein, in providing the foil, the foil has a haze of less than 5%.

13. The method according to claim 1, wherein, in providing the foil, the foil with the flame retardant and the anti-stick filler has a haze of less than 2%.

14. A system for producing a Pepper's Ghost Illusion comprising:
   a roll of biaxially-oriented, reflective and transparent foil in which a flame retardant is at least partially dissolved therein, the foil exhibiting a haze of less than 10%; and
   an anti-stick filler added during a foil extrusion process such that the anti-stick filler reduces a tendency of adjacent foil surfaces from sticking to one another.

15. The system of claim 14, wherein the foil exhibits a haze of less than 5%.

16. The system of claim 14, wherein the flame retardant is fully dissolved therein.

17. The system of claim 14, wherein the foil further comprises an anti-reflective coating.

18. The system of claim 14, wherein the foil exhibits a haze of less than 2%.

* * * * *